US006842692B2

(12) United States Patent
Fehr et al.

(10) Patent No.: US 6,842,692 B2
(45) Date of Patent: Jan. 11, 2005

(54) COMPUTER-CONTROLLED POWER WHEELCHAIR NAVIGATION SYSTEM

(75) Inventors: Linda Fehr, Berwyn, IL (US); Steven B. Skaar, Granger, IN (US); Guillermo Del Castillo, Mishawaka, IN (US)

(73) Assignees: The United States of America as represented by the Department of Veterans Affairs, Washington, DC (US); University of Notre Dame, Notre Dame, IN (US)

( * ) Notice: Subject to any disclaimer, the term of this patent is extended or adjusted under 35 U.S.C. 154(b) by 24 days.

(21) Appl. No.: 10/187,989

(22) Filed: Jul. 2, 2002

(65) Prior Publication Data

US 2004/0006422 A1 Jan. 8, 2004

(51) Int. Cl.[7] .................. G01C 21/00; G01C 22/00; G06G 7/78; G05D 1/00
(52) U.S. Cl. .................. 701/200; 701/201; 701/206; 701/207; 701/211; 701/23; 701/25; 701/27; 701/28
(58) Field of Search ................. 701/200, 201, 701/206, 207, 211, 23, 25, 27, 28

(56) References Cited

U.S. PATENT DOCUMENTS

| 4,278,142 A | 7/1981 | Kono ................. 180/168 |
| 4,626,993 A | 12/1986 | Okuyama et al. ........ 367/116 |
| 4,647,784 A | 3/1987 | Stephens ............... 250/561 |
| 4,817,000 A | 3/1989 | Eberhardt |
| 5,006,988 A | 4/1991 | Borenstein et al. |
| 5,033,000 A | 7/1991 | Littlejohn et al. |
| 5,051,906 A | 9/1991 | Evans, Jr. et al. |
| 5,076,384 A | 12/1991 | Wada et al. ........... 180/167 |
| 5,155,684 A | 10/1992 | Burke et al. |
| 5,363,933 A | 11/1994 | Yu et al. .............. 180/6.5 |
| 5,497,056 A | 3/1996 | Kurland et al. ......... 318/209 |
| 5,545,960 A | 8/1996 | Ishikawa .............. 318/587 |
| 5,677,836 A | 10/1997 | Bauer |
| 5,687,136 A | 11/1997 | Borenstein ............. 382/104 |
| 5,793,934 A | 8/1998 | Bauer ................. 395/85 |
| 5,804,942 A | 9/1998 | Jeong ................. 318/580 |
| 5,812,978 A | 9/1998 | Nolan ................. 704/275 |

(List continued on next page.)

OTHER PUBLICATIONS

Holly A. Yanco, *Preliminary Investigation of a Semi–Autonomous Robotic Wheelchair Directed Through Electrodes*, RESNA '97, Jun. 20–24, 1997, pp. 414, 416.

(List continued on next page.)

Primary Examiner—Thomas G. Black
Assistant Examiner—B. J Broadhead
(74) Attorney, Agent, or Firm—Dykema Gossett PLLC

(57) ABSTRACT

A wheelchair navigation system having motorized wheelchair which is powered by at least one onboard battery, and a battery charger. The navigation system also has a filter-based estimator with interface software running that is operated on an onboard laptop computer. Dual cameras, proximity sensors, microphones, and rotation sensors for the wheels are mounted to the wheelchair. Small markers are placed on the walls of a location or room. The navigation system uses the proximity sensors, rotation sensors and cameras in conjunction with the specialized software to determine where objects or impediments are located in the room and thereby redirect the path of the wheelchair so as to avoid such objects. The wheelchair is walked through the marked location thereby 'teaching' various paths which are recorded in the computer and recalled later when the wheelchair is in use.

13 Claims, 7 Drawing Sheets

U.S. PATENT DOCUMENTS

| | | | |
|---|---|---|---|
| 5,911,767 A | 6/1999 | Garibotto et al. | 701/28 |
| 5,961,571 A | 10/1999 | Gorr et al. | 701/207 |
| 5,999,866 A | 12/1999 | Kelly et al. | 701/28 |
| 6,078,849 A | 6/2000 | Brady et al. | 701/28 |
| 6,108,592 A * | 8/2000 | Kurtzberg et al. | 701/1 |
| 6,125,191 A | 9/2000 | Mashimo et al. | 382/104 |
| 6,135,228 A | 10/2000 | Asada et al. | 180/204 |
| 6,154,690 A | 11/2000 | Coleman | 701/1 |
| 6,195,610 B1 | 2/2001 | Kaneko | 701/200 |
| 6,205,380 B1 | 3/2001 | Bauer et al. | 701/23 |

OTHER PUBLICATIONS

Skaar, S.B. and Yoder, J.D., "Extending Teach–Repeat to Nonholonomic Robots," Structronic Systems: Smart Structures, Devices, and Systems; Part II, Systems and Control, H.S. Tzou and A. Guran, eds, Copyright 1998 by World Scientific Publishing Co. Pte, Ltd., Singapore, 1998.

E.T. Baumgartner and S.B. Skaar., "An Autonomous Vision–Based Mobile Robot," IEEE Transactions on Automatic Control, vol. 39, No. 4, pp. 493–503, Mar. 1994.

* cited by examiner

COMPUTER-CONTROLLED POWER WHEELCHAIR NAVIGATION SYSTEM

GOVERNMENT SPONSORED RESEARCH

The U.S. Government has a paid-up license in this invention and the right in limited circumstances to require the patent owner to license others on reasonable terms as provided for by the terms of Intramural Merit Review #B1684P awarded by the Department of Veterans Affairs.

BACKGROUND OF INVENTION a. Field of Invention

This invention relates to a wheelchair navigation system, and more particularly to a computer-controlled power wheelchair navigation system that allows a person to navigate through a location with pre-established paths, and with voice or manually activating the computer.

b. Description of Related Art

A significant population of severely disabled people require mobility assistance in daily living activities beyond what is available in conventional powered wheelchairs. The present invention is aimed at a segment of that population, those unable to manually guide the movements of powered wheelchairs, to provide them with autonomous navigation capabilities in repetitively used environments such as homes, offices, hospitals, and public buildings and spaces.

There are a number of navigational methods that already exist for autonomous and semi-autonomous vehicles. Current navigational systems for semi-autonomous vehicles usually have controls such as a joystick or an ocular device, and employ overriding features such as obstacle or collision avoidance. Some autonomous systems utilize path-following methods such as a magnetic strip, optical strip or targets to provide paths from an origin to a destination. These methods have difficulty handling multiple and intersecting paths, if they can handle them at all.

There are three systems specifically identified in the prior art, all of which differ from the present invention. A robotic wheelchair system, commonly known as the WHEELSELSY, developed by the Massachusetts Institute of Technology Artificial Intelligence Laboratory, operates as a semi-autonomous system that is capable of being controlled by head and eye movements of the rider.

Another wheelchair system known as NavChair® is an adaptive shared control system that is semi-autonomous. The NavChair® uses guidance command from the rider and exerts control in areas such as obstacle avoidance or object approach.

The Wheelchair Project also has a system that uses landmark recognition and obstacle avoidance as well as interaction across a spectrum of automations from low level motion guidance to selection of destination wherein the wheelchair delivers the rider.

None of these known assistance devices are fully autonomous operations. They do, however, share many common features, including adaptability to a multitude of different vehicles, varying levels of operator control authority, and obstacle avoidance.

The autonomous navigation system of the present invention was developed for use in rehabilitative or therapeutic environments as well as domestic and vocational circumstances. It can also be modified for use in independent mobile circumstances for the severely disabled such as public access buildings like museums and airports. Secondary applications for autonomous transport are also foreseeable, although not specifically identified herein.

BRIEF DESCRIPTION OF THE INVENTION

An object of the present invention is to provide a navigation system that will enable independent mobility for handicapped people.

Another object of the present invention is to provide a computer-controlled wheelchair that is capable of navigating in various spaces via pre-determined paths of travel, based upon the approach disclosed in the article, "Extending Teach-Repeat to Nonholonomic Robots," Skaar, S. B. and Yoder, J. D.

The present navigation system utilizes a commercially available powered wheelchair that has been modified to include hardware, encoding devices to provide odometry, video capture devices to provide absolute position information, ultrasonic sensors to detect obstacles, as well as drive and navigation systems. The computer's software has the function of path and destination learning, recognition of obstacles, and navigation to a selected destination.

The computer-controlled power wheelchair of the present system is a learning, autonomous, obstruction avoiding, navigation system for motorized wheelchairs. The system learns by being driven over the desired routes to the selected destinations and committing the routes and destination to memory via the computer system. After learning the route, the wheelchair is capable of autonomously navigating any of the learned routes which is selected by the rider. The 'teach and learn' system of route establishment is unique within this field of application. The present system is also capable of easily and accurately maneuvering through doorways.

The present computer-controlled power wheelchair navigation system provides the physically disabled rider with means of 'on command' navigation over frequently used paths. The system was designed to operate either with guidance from the rider or with rider input consisting of a destination command (autonomous operation). This system utilizes any commercially available motorized wheelchair as its base, and is powered by three onboard batteries. A battery charger is also included to keep the batteries charged and operable.

Navigation within the system is carried out by use of a known filter-based estimator, such as that by Kalman®. The estimator is used in conjunction with interface software running on an onboard laptop computer. Dual cameras, proximity sensors, microphones, and rotation sensors for the wheels are all mounted to the wheelchair. These electronic components are used with the specialized software in conjunction with small visual markers placed on the walls of the location to be navigated which provide an accurate path over which the wheelchair travels.

The wheelchair is 'taught' or has pre-programmed paths to various destinations by having an able-bodied person push the chair once, with or without the rider, along any desired route of travel while the computer records information from the sensors. Once destinations have been established, the rider can then select any of these locations and the navigation system will steer the wheelchair to that location. Paths can be reversed and/or merged to reach a desired location, or in order to avoid an obstacle. The system will choose the shortest uninterrupted path to its destination.

The computer can be operated by two modes of operation: voice mode and switch mode. In the voice mode, the rider controls the navigation system by speaking commands into a microphone that is attached to the wheelchair and connected to the computer. If the rider cannot address the correct command, they can request a scan of all available commands. A list is simultaneously displayed on the screen and spoken by the text-to-speech converter, when the correct command is selected.

In switch mode, the computer reads the available locations aloud through a speech synthesizer and earphone. When the desired location is spoken, the rider triggers a switch identifying the location. Switching mechanisms have been mounted in various locations on the chair and can be activated by virtually any part of the rider's body.

The rider can give commands to the computer controlling the chair at any time during navigation. Such commands can be issued by speaking words or by switching triggers. Some common commands that may be used include: stop, continue travel, return to the last starting point, go faster or slower, and pause the navigation system; however such commands are not limited to these particular commands, but may be customized to fit the rider's needs.

When the rider chooses a destination, they will receive feedback from the computer either by a visual display or by synthesized speech. Proximity sensors located on the wheelchair locate obstacles that are in the path of the wheelchair during travel. The sensors trigger the computer to stop the wheelchair if travel is obstructed. The system does not allow the wheelchair to continue to the selected destination until the object is removed, and the wheelchair can be directed to return to a previous point so that it may travel to an alternate destination.

With respect to alternative navigation technologies, fixed track systems pose numerous disadvantages: difficult and inflexible implementation, undue complexity as the number of intersecting paths grows larger, and inability of the wheelchair to depart from and return to the prescribed path without outside intervention. Use of sonar for point-to-point navigation presents such problems as specular reflection (spurious measurements obtained when sonar 'bounces' off multiple surfaces) and the likelihood of multiple chairs intercepting each other's navigation signals in institutional settings.

In contrast, multiple chairs fitted with the vision-based navigation technology may readily share wall-mounted cues without difficulty, and the navigation system's use of sonar to locate obstacles within 2–3 feet of the chair is significantly less challenging than employing sonar for navigation. Finally, some researchers are investigating autonomous navigation via video detection of 'natural landmarks', i.e. locating and steering toward a door by identifying a doorknob. In comparison, the present navigation system relies on images with a distinctive 'signature.' This lends itself to significantly simpler and more straightforward implementation with negligible danger of the estimator becoming 'confused'. Of course, the navigation system technology is inherently limited to modified environments, those defined by cue placement and taught paths.

Other objects, advantages and novel features of the invention will become more apparent from the following detailed description of the invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate preferred embodiments of the invention and together with the detail description serve to explain the principles of the invention. In the drawings.

DETAILED DESCRIPTION OF THE INVENTION

Figure 1:
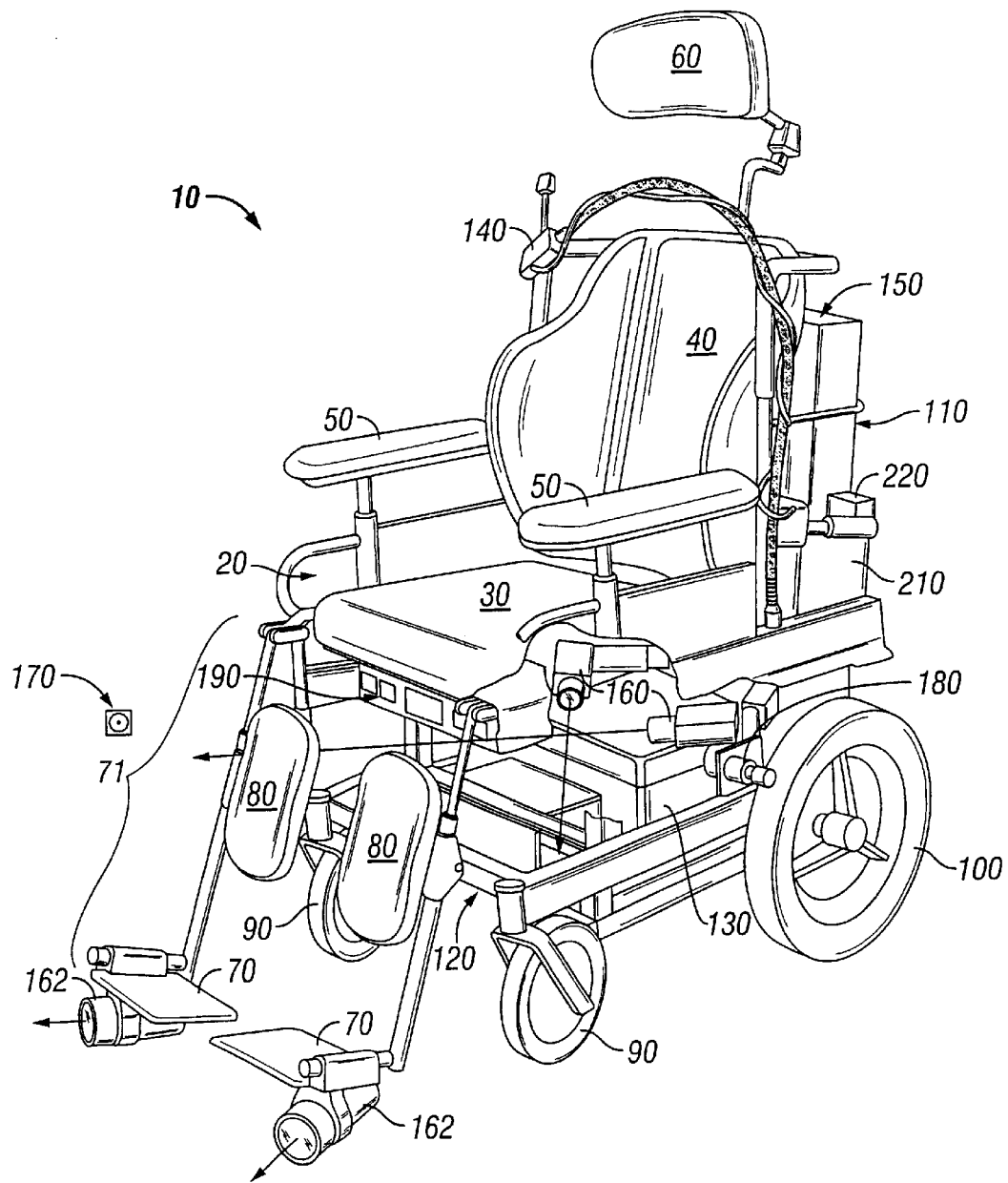
FIG. 1 is a front perspective view of the computer-controlled power wheel chair of the present invention.

The computer-controlled power wheelchair navigation 10 is comprised of a wheelchair 20 with the traditional amenities such as a seat 30, a back support portion 40, arms 50, a head rest 60, elevating leg-rests 71 including foot rests 70 and leg supports 80, front wheels 90, rear wheels 100, rear storage space 110, and an undercarriage 120. The wheelchair 20 is powered by a power supply such as batteries 130. There are a variety of means available to control the wheelchair, such as a chin switch 140 shown in FIG. 1, however other conventional control means such as joysticks, buttons, voice control and etc, all known in the art, may be incorporated into the present system.

The wheelchair navigation system 10 also has at least one computer 150 that is seated in a computer docking station within the rear storage space 110. At least one video camera 160 is connected to the computer 150 and aids in identifying the location of the wheelchair 20 when in use. Any of the video cameras 160 detect cues 170 that are strategically placed throughout a given location. Input to the navigation system's estimation algorithm in the computer 150 is provided by at least one digital shaft encoder 180 mounted at the wheelchair's drive wheel to sense wheel rotation, and by at least one monochrome video camera which detects wall-mounted cues 170 via video 160. The cues 170 provide information to the computer 150 so that the computer 150 can identify the location of the wheelchair 20 and provide a pre-programmed or taught path for the wheelchair 20 to follow.

The basic components of a filter and a differential equation model of nonlinear dynamics of the wheelchair 20 combined with a sequence of incoming sensor information, wheel rotations and video images, produce ongoing best estimates of the position and orientation or 'state' of the wheelchair 20 in the two-dimensional space of the floor.

The computer-controlled wheelchair navigation system 10 relies on a unique 'teach-repeat' paradigm of control in which a person manually pushes the wheelchair 20 along each path to be included in the system's 10 repertoire. New destinations or routes of travel made obsolete by changes in the environment are easily 'retaught' in the same way. The system uses an estimator that is based on a Kalman® filter. The estimator is activated throughout the pre-programming or teaching episodes, and a compact record of the position and orientation histories of each trajectory is stored in the computer 150, establishing a reference path for each desired destination. In subsequent autonomous navigation, the wheelchair navigation system 10 chooses the point toward which to steer based on the geometric relationship between the filter's current estimate of the actual position of the wheelchair 20 and the previously 'learned' reference path.

In one embodiment, inputs as well as the output voltage to the wheelchair controller 190 are interfaced with the computer 150. All user input to the system is via a standard keyboard (not shown). Ultrasonic proximity sensors 162 are interfaced to a second computer 152 (not shown) which analyzes the time rate of change in the distance of near objects so as to assess the likelihood of a collision. The second computer 152 generates a digital proceed/halt signal serially interfaced to the full-sized navigation computer 150. By continuously polling this signal, the navigation system 10 can bring the wheelchair 20 smoothly to a rest to avert collision with an obstacle, resuming travel along the reference path once the obstacle is removed.

The base for the navigation system is a commonly known wheelchair 20. The wheelchair 20 can be adjustable and such amenities will not interfere with the wheelchair navigation system 10. A pneumatic back support system 40, adjustable headrest 60, and elevating leg supports 80 may also be added to the wheelchair 20 to provide maximum flexibility with respect to riders with limited postural stability.

Figure 2:
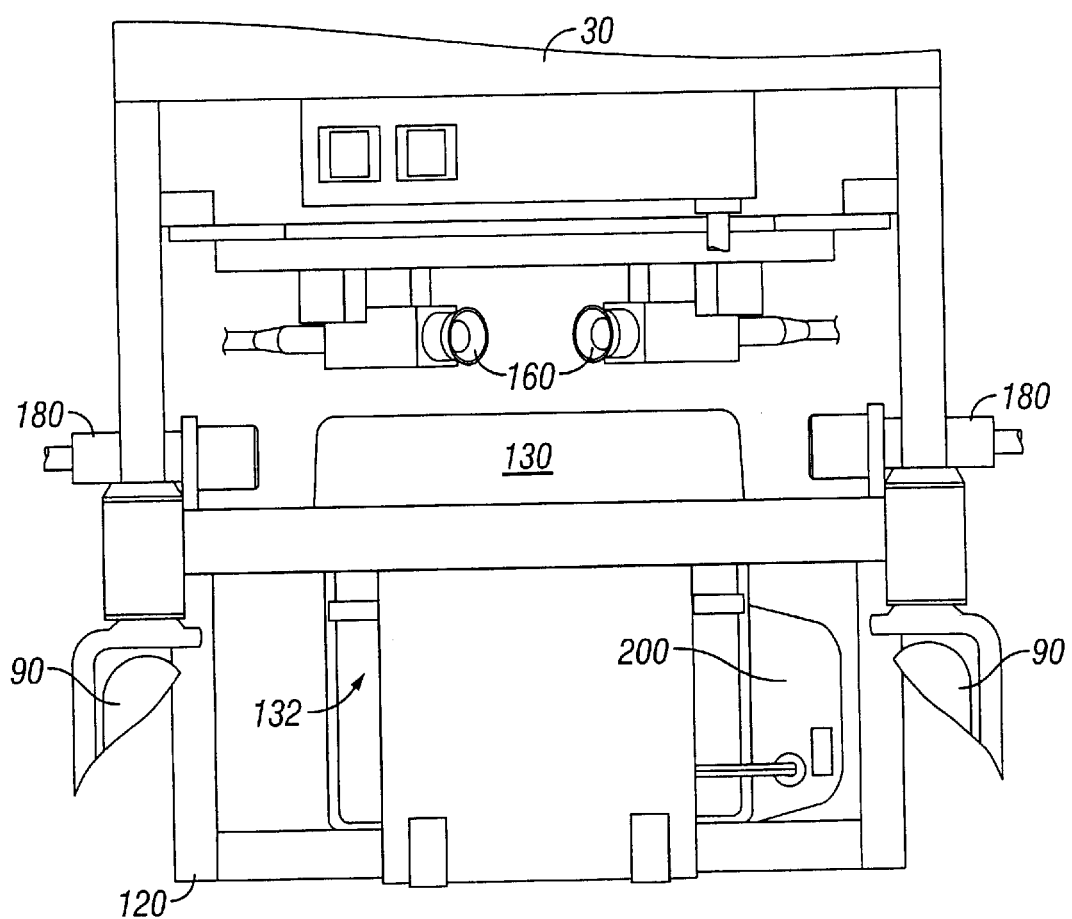
FIG. 2 is a partial front elevation view of the undercarriage of the computer-controlled power wheel chair.

The wheelchair's undercarriage 120, as shown in FIG. 2, provides the support base for the navigation system components. The undercarriage 120 accommodates the video cameras or sensors 160 which are mounted below the wheelchair seat 30 and positioned in such a way that their view is unobstructed by the rider when they are seated in the wheelchair 20. The undercarriage 120 also houses, in addition to at least one wheelchair battery 130, a separate battery 132 and a DC/AC inverter 200 for powering the components of the navigation system 10. In this particular embodiment of the wheelchair navigation system, there are two 24 volt wheelchair batteries 130, with an additional 12 volt separate battery 132, however it is understood that various types and sizes of other batteries known in the art may be used within this system.

A second embodiment of the navigation system uses a single computer 150. The computer 150 must accommodate interfacing with a variety of hardware components. The second embodiment also has digital encoders 180 and upgraded video cameras or sensors 160. The second embodiment uses PCMCIA cards for capturing digital encoder signals, and for providing the output voltage to the wheelchair controller 190. Since no suitable 'frame grabber' board having either a PCMCIA or USB interface can be found, the present system incorporates a full-sized PCI frame grabber, and interfaces it with the computer 150 via a docking station 210. Video cameras 160 are serially interfaced to the computer 150.

Navigation and obstacle detection software modules use various types of programming language such as C and C++, but are not limited thereto. The software module is also designed to run as 'threads' or processes controlled by the user interface software. At the same time, the navigation software is extensively modified to reflect the newly-modeled system dynamics of the wheelchair 20 as well as the upgraded components such as cameras and PC cards.

User interface software, such as Windows-95 based visual C++ programming is used in the present embodiment, however it is foreseeable that other comparable software can be used. The software enables the rider to control the navigation system 10 by speaking commands and/or switch activation. The determination of whether to commence navigation in voice or switch mode is made when the main software module is launched.

Figure 3:
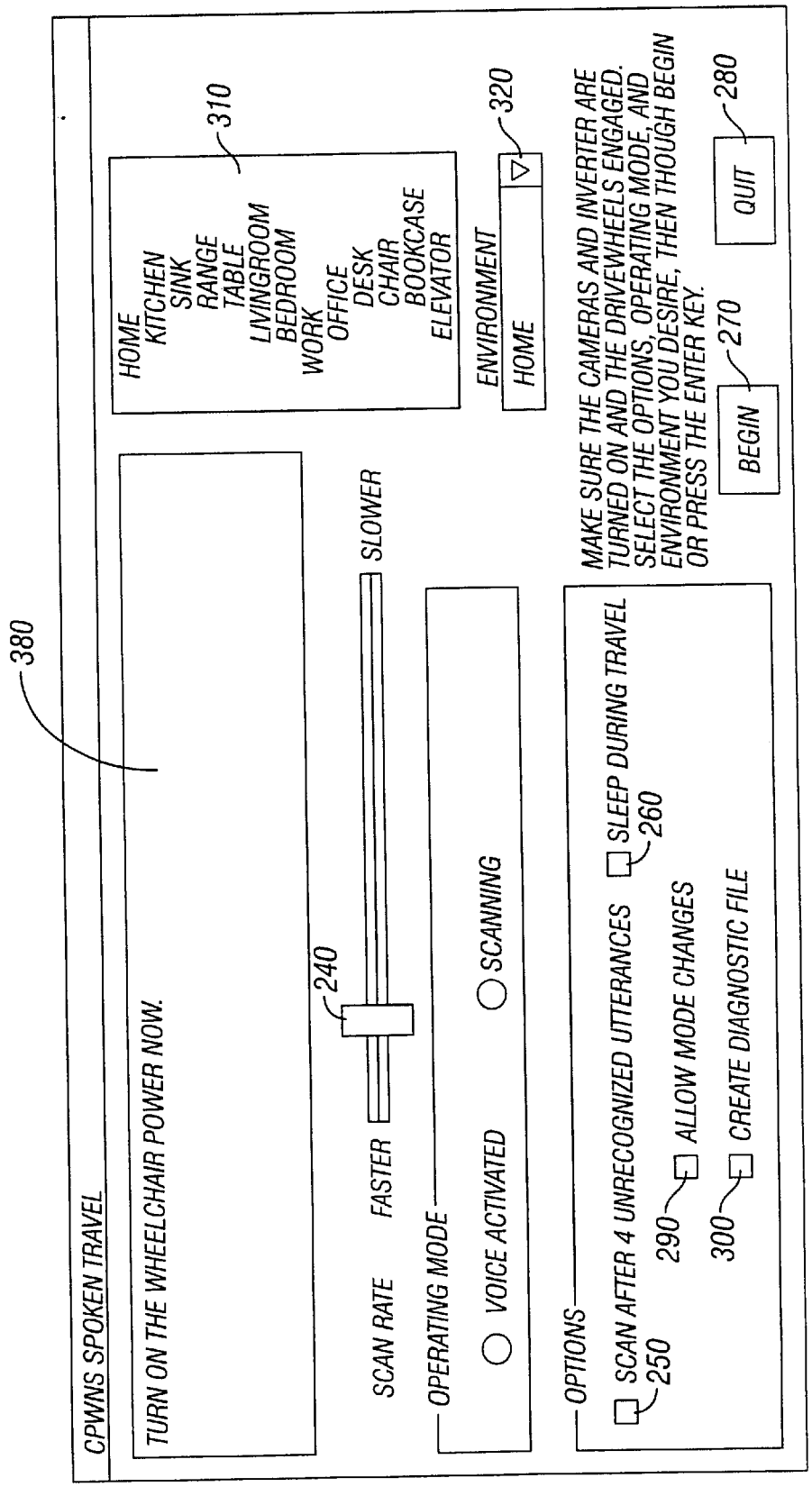
FIG. 3 is a front elevation view of the computer screen on the computer-controlled power wheel chair.

A dialog window 230, shown in FIG. 3, governs which mode the navigation system 10 is going to operate in. Other characteristics of the rider's ensuing navigation session is input via a number of checked boxes, radio buttons, and a slider control shown in the dialog window 230. The values of these controls are saved to disk in the computer 150 from session to session so that if the rider is using the chair with the same configuration of options as they used previously, an able-bodied individual may launch the main software module, ensure the rider has access to their switch and/or microphone, position the wheelchair 20 in such a way that it can detect its initialization cues 170, and start the program. From this point forward, no further intervention on behalf of an able bodied non-rider is required other than perhaps to shut the system down after use and recharge the batteries, if such is not accessible to the rider.

In both voice and switch modes, feedback to the rider is provided by synthesized speech. For example, if the rider requests travel to a desk as a location, the computer will inquire if the rider is ready to engage the path 'Desk'. The rider must always confirm their intention to travel with a specific command, either spoken or manually input, at which time motion along the chosen path commences.

If the rider issues a command not to travel, the travel is canceled leaving the rider free to select another destination. During travel, the rider may stop the travel of the wheelchair 20 by issuing a command to discontinue travel, such as to wait or stop. These commands interrupt the wheelchair's motion (without confirmation), and the chair 20 remains stationary until a command is issued for the wheelchair 20 to proceed. The rider is informed when the wheelchair 20 arrives at its final destination (or retraces its path completely back to its starting point) with a message that the travel has been completed. Such commands can be either audio commands or switch activated commands.

In the switch input mode, the rider wears either a headset or an earplug to facilitate aural scanning (not shown). In this mode, a text-to-speech (TTS) engine sequentially 'speaks' a list of available destinations or commands. When the rider activates the switch, the most recently articulated destination or command is selected. The speed with which the synthesized voice scans the rider's options maybe adjusted at any time during the navigation session by lengthening or shortening the pause separating each utterance. The scanning rate is set by a slider control 240 on the initial dialog screen 230 (FIG. 3). This dialog window 230 also contains an options section wherein there is a box designated for scanning after a specified number of utterances 250 as well as another box designated to allow for sleep during travel 260 of the wheelchair 20. If the sleep during travel box is checked, scanning is suspended once the rider chooses and confirms a destination, and motion commences. Otherwise, scanning is continuous during travel. In either case, the rider may suspend scanning at any time by issuing a command to shut the navigation system 10 down.

Once navigation has been suspended, either by explicit command or because travel has commenced, scanning can be resumed at any time by activating the switch. Any switch 140 may be used as an input mechanism for the device. Examples include but are not limited to: a bite switch (a small plastic pipette interfaced to a pneumatic switch), a sip-puff switch, a "twitch" switch, or any "universal" switch (stick, pillow, pneumatic cushion, etc.) which can be activated by virtually any part of the body. These switches 140 can be mounted to any part of the wheelchair 20 and may be swapped in and out of the system via a small modularized electronics or switch input box 220 (FIG. 1) interfaced to the parallel port of the computer 150.

In voice mode, the rider wears a headset with a small microphone (not shown) which are commonly known in the art. A voice recognition computer program, also commercially available, is used to facilitate the spoken commands. Prior to operating the navigation system by voice for the first time, the rider must "train" the speech recognition software to recognize their individual voice. Nevertheless, the navigation system user interface software provides for optional supplementary switch input to handle recognition errors. For example, if the check box "Scan after 4 unrecognized utterances" 250 is left unchecked on the setup dialog window 230 (FIG. 3), unrecognized speech, such as conversation, is ignored by the navigation system 10. If this box 250 is checked, the system will respond to each unrecognized utterance with either a voice then synthesized message or a typed response that the command is unclear. Then the computer 150 will either prompt the rider for another command, or wait until another command is given. After a series of unrecognized utterances (i.e. three if the number of utterances is set for four), the software can "read" to the rider a list of available destinations. After yet another a unrecognized utterance (i.e. the fourth), the software enters scanning mode and the rider makes their selection via switch activation. After a successful selection by switch, the software returns to voice mode. Regardless of the status of the options box 250,260, the rider has the option to suspend voice recognition any time by rendering a command for the system to close down. Once suspended, the navigation system user interface software will only respond to a preselected activation command (i.e. the spoken word "Navigate"), which reactivates the voice recognition. As a final feature in voice mode, the rider may elicit an aural listing of the available choices at any time by asking for their options.

The rider is also capable of changing between the voice and scanning modes. This is facilitated by another options box 290, labeled "Allow mode changes" on the setup dialog screen (FIG. 3). Therefore, as conditions vary the rider can direct the navigation system either verbally by spoken words or by switch activation. This feature is optional since not all riders will be able to use both modes. In other cases, the rider may have a preference for a given mode but may choose to change modes when they encounter changing conditions. The rider changes operating modes in the same way that other commands are issued: by manually selecting the specified mode while scanning, or by speaking a designated phrase identifying the scanning mode while in voice mode. The rider may move between operating modes as often as desired.

The rider may use the dialog window 230 as an aid in identifying the various destinations known to the navigation system 10 by viewing a box 310 listing a tree structure list of the various destinations. Names at the root level may represent separate environments (i.e. home). The next level of destinations may represent rooms or other areas of interest within the given environment (i.e. the kitchen), with the lowest level representing specific locations within rooms or areas (i.e. the sink or stove).

Using this tree structure 310, only destinations reachable from a given location are available when the rider is at that location. For example, if the rider is in the kitchen at home, the elevator at work is not an available destination. This type of organization produces the shortest possible list of options to scan in switch mode, and minimizes recognition errors in voice mode by limiting the active vocabulary to a logical subset of possible destinations. It also allows use of destination names that would otherwise be ambiguous. For example, there may be a table in the rider's kitchen as well as in their bedroom. Knowledge of the rider's current location resolves the ambiguity. If paths have been taught in multiple environments, the environment for the ensuing navigation session may be chosen from the drop-down box 320.

With the first embodiment, initial position estimates were either entered manually from the keyboard or were read from the first path file to be executed. This demanded exact placement of the wheelchair 20 at these coordinates prior to commencing travel, an inconvenient and potentially difficult task with a rider in the chair. Therefore, an additional software module can be used to estimate the wheelchair's initial position based on each camera's 160 ability to locate a unique configuration of cues 170. To enable autonomous navigation for the rider, the wheelchair 20 need only be placed anywhere in the vicinity of these cues 170 when the main software module is launched.

One of the first tasks of the locator module is to call the initialization routine in a loop. If either camera 160 cannot detect its initialization cues 170, the caregiver/attendant is notified accordingly by both a synthesized voice message and a message box (not shown). The message instructs the rider to verify that the cameras 160 are turned on, to ascertain that the cues 170 are not obstructed, and if necessary, to reposition the wheelchair 20. Having done so, the caregiver/attendant merely touches a key to repeat initialization.

It may be possible for the rider to control velocity of the wheelchair 20 with commands. However, it may also be controlled automatically by the navigation algorithm which slows the chair when position estimate errors are high, so that it may process more video information per inch traveled. The navigation algorithm may increase speed gradually as estimates improve.

The rider also has the ability to stop the wheelchair 20 completely and then either continue along the selected path or retrace the path back toward its starting point.

If a conversation takes place within the vicinity of the wheelchair 20, the rider may suspend the voice activated user interface to prevent speech recognition from being confusing, or so that those in the conversation will not be distracted by continued aural scanning. The wheelchair 20 may remain stopped for any length of time, and may continue along the selected path simply by the rider issuing a command to continue.

Alternatively, the rider may issue the command to go back, and the wheelchair will commence retracing its path. Hence, the rider may change their decision of travel to a particular destination at any time and return to the point of departure. The command to go back or return is also useful if the rider has issued a command to stop late in the process, and has actually passed the point where they wished to stop. After issuing the command to go back, the rider may back up to the desired stopping point, issue a command to stop again, and then continue at the rider's discretion. This combination of features, in effect, provides a virtually infinite number of destinations along taught paths.

It should be noted that the halt command is intended only for the rider's convenience and operating functionality. It is recognized that any rider in any particular situation may or may not have the ability to stop the wheelchair 20 quickly enough to avoid an obstacle. The chair's proximity sensors 162 are intended for this purpose.

The original navigation software of the first embodiment is provided for execution of only one pre-programmed path at a time. With the updated software of the second embodiment, if no pre-programmed path exists between the rider's current location and the requested destination, the system seeks to construct a path by joining first two, then three, then four or five pre-programmed paths. The shortest possible path is constructed, and the process is seamless to the rider.

The navigation system also has a utility that takes an existing pre-programmed path and creates a new path with all segments reversed. This utility and the path joining capability are of significant benefit to the rider and their caregiver since it is no longer necessary to teach or pre-program a specific path from each location in the environment to every other location in the environment. The utility becomes increasingly important as the number of locations increases since the number of possible paths connecting n destinations is n*(n−1) (i.e. 90 paths for 10 destinations).

Figure 4:
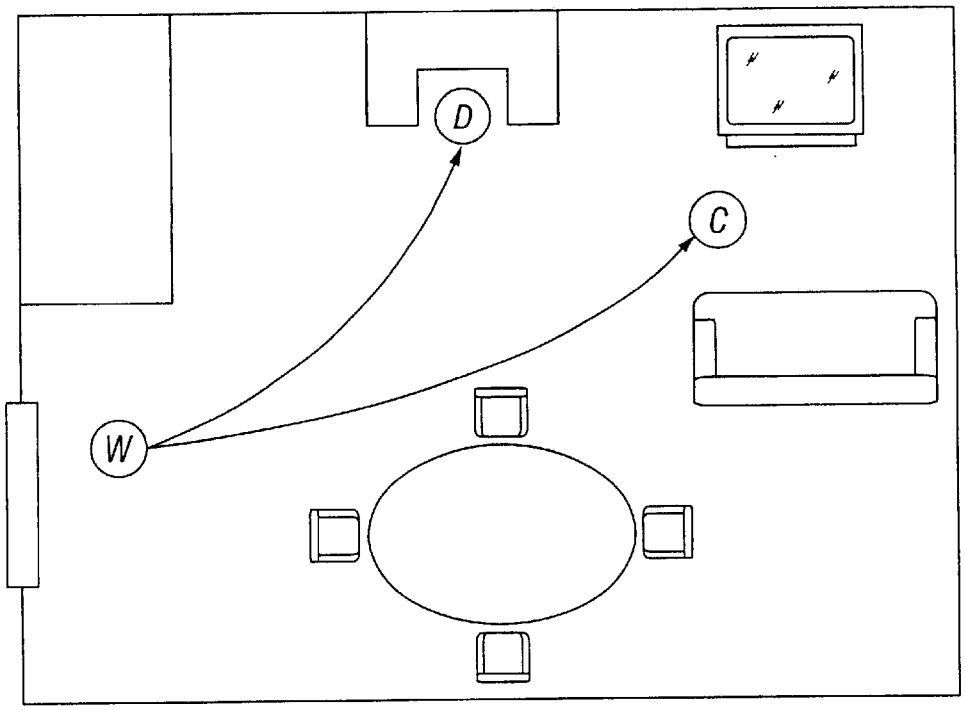
FIG. 4 is a top plan view of a sample room showing the various paths.

The path utility is only appropriate in certain circumstances since the rider does not generally wish to travel in reverse. However, the placement of furniture and fixtures together with the need for a specific terminal orientation of the wheelchair 20 may dictate that the most expedient route of travel is in the reverse. This is particularly true when distances are short. For example, in FIG. 4, the best route from the desk D to the window W may be the reverse of the path from the window W to the desk D. Similarly, if the chair is at the couch C, there may be insufficient space to turn the wheelchair 20 around so the best path to the window W is in reverse, and the most expedient path to the desk D is to back up to the window W and proceed to the desk D using the path already taught (path W-D from the window W to the desk D).

If all these conditions were true, the six possible paths connecting all three destinations W,D,C are implemented by teaching only the two paths shown, path W-D and path W-C. Even when the path reversal utility is not appropriate, the path joining capability may significantly reduce teaching time and effort, depending on the geometry of the environment and the fact that paths may be taught to intermediate locations which are not true destinations of interest.

Figure 5:
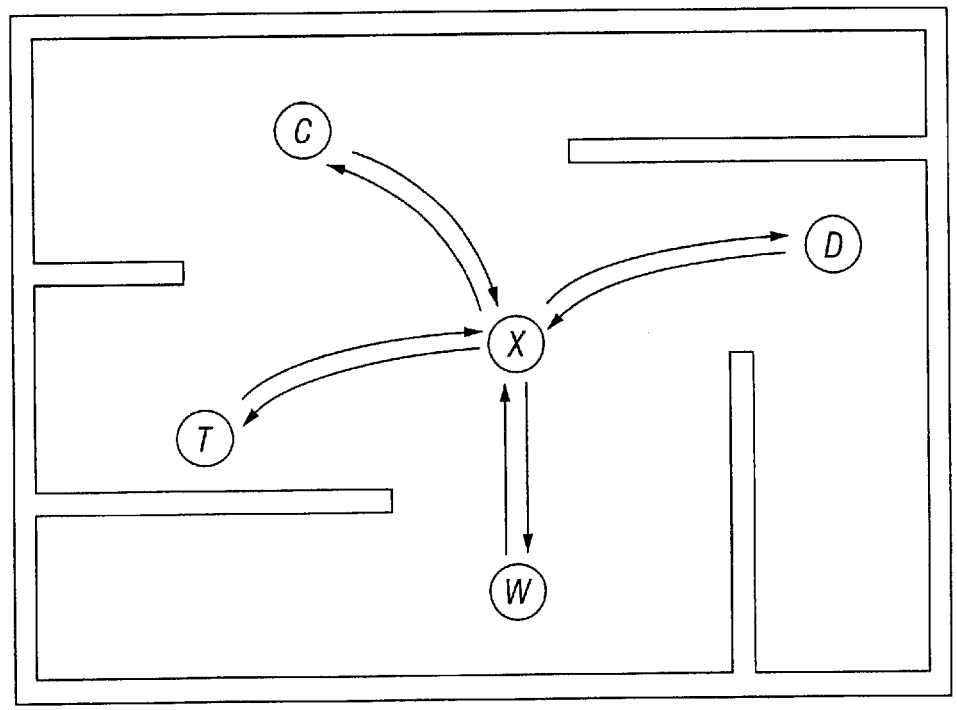
FIG. 5 is a top plan view of a sample room showing various paths.

As shown in FIG. 5, a person other than the rider may teach or pre-program paths to an intermediate node X which is central to four desired locations W,D,C,T. With path joining, all 12 possible paths between these four locations may be realized using only the 8 pre-programmed or taught paths shown, X-T, T-X, X-C, C-X, X-D, D-X, X-W, and W-X.

As previously discussed, the first embodiment has navigation software running on a computer 150 interfaced with a second computer 152. The second computer 152 runs obstacle detection software. All user input to the system is done via a keyboard.

Figure 6:
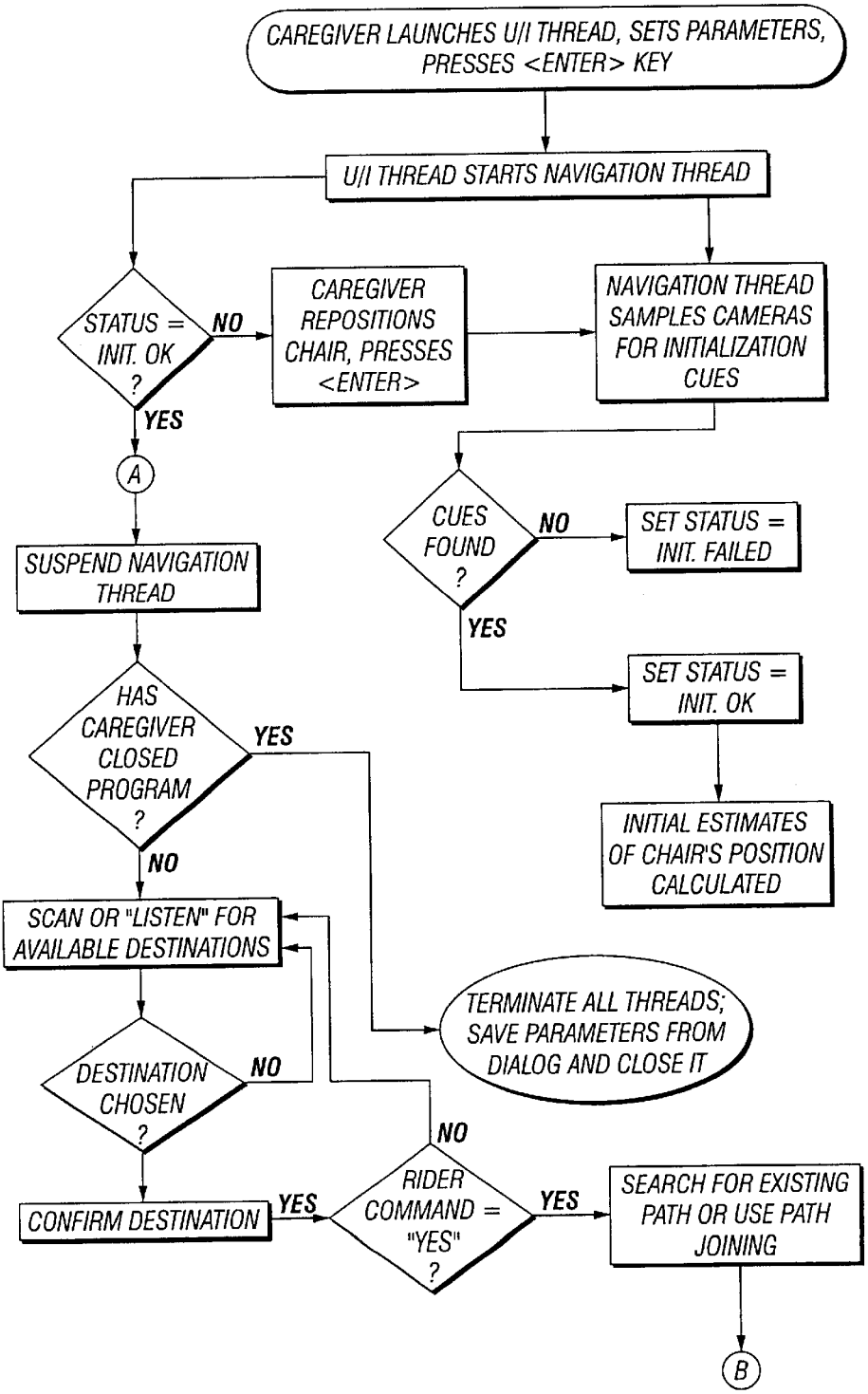
FIG. 6 is a schematic chart of parallel user-interface processes.
Figure 6:
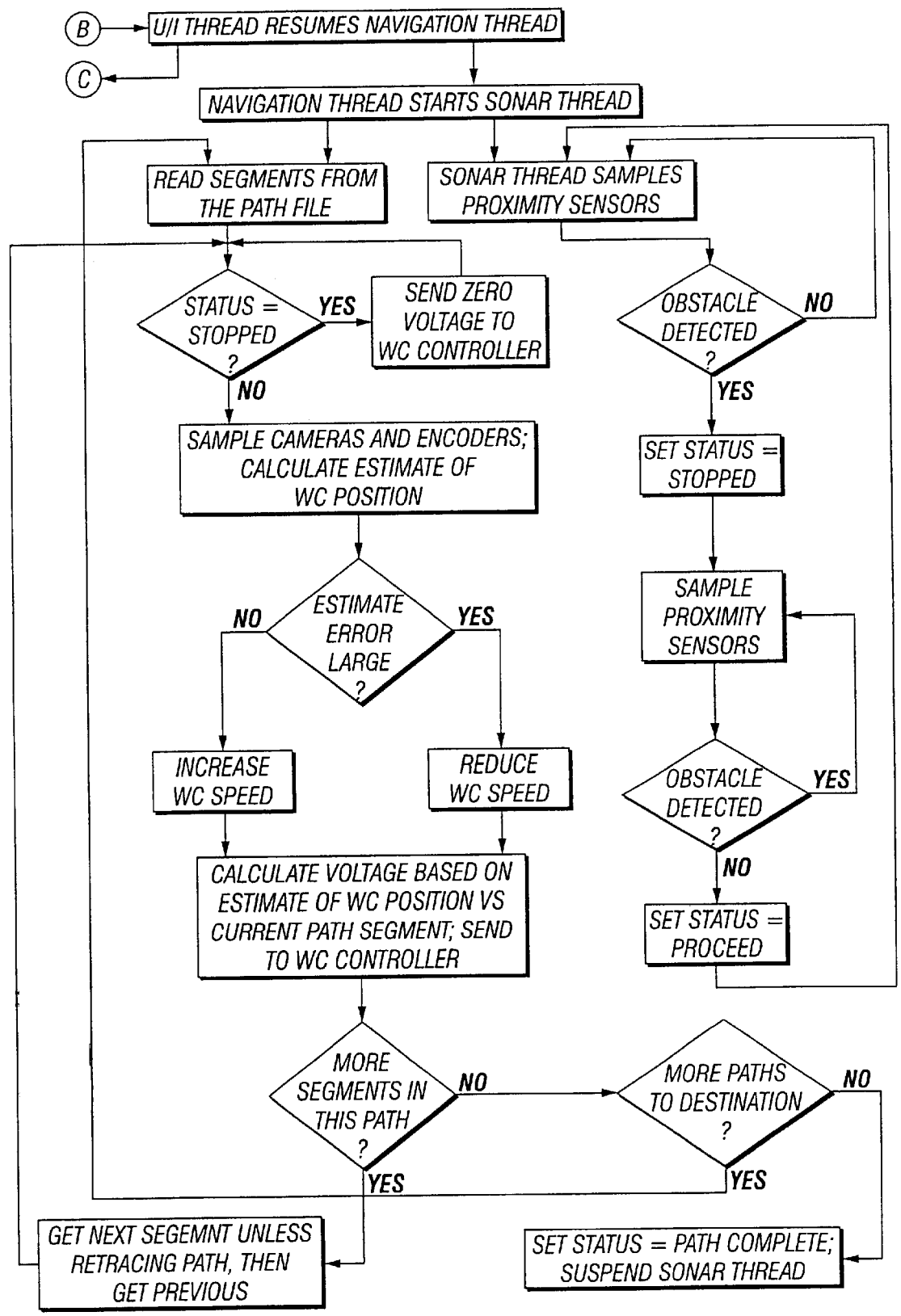
Figure 6:
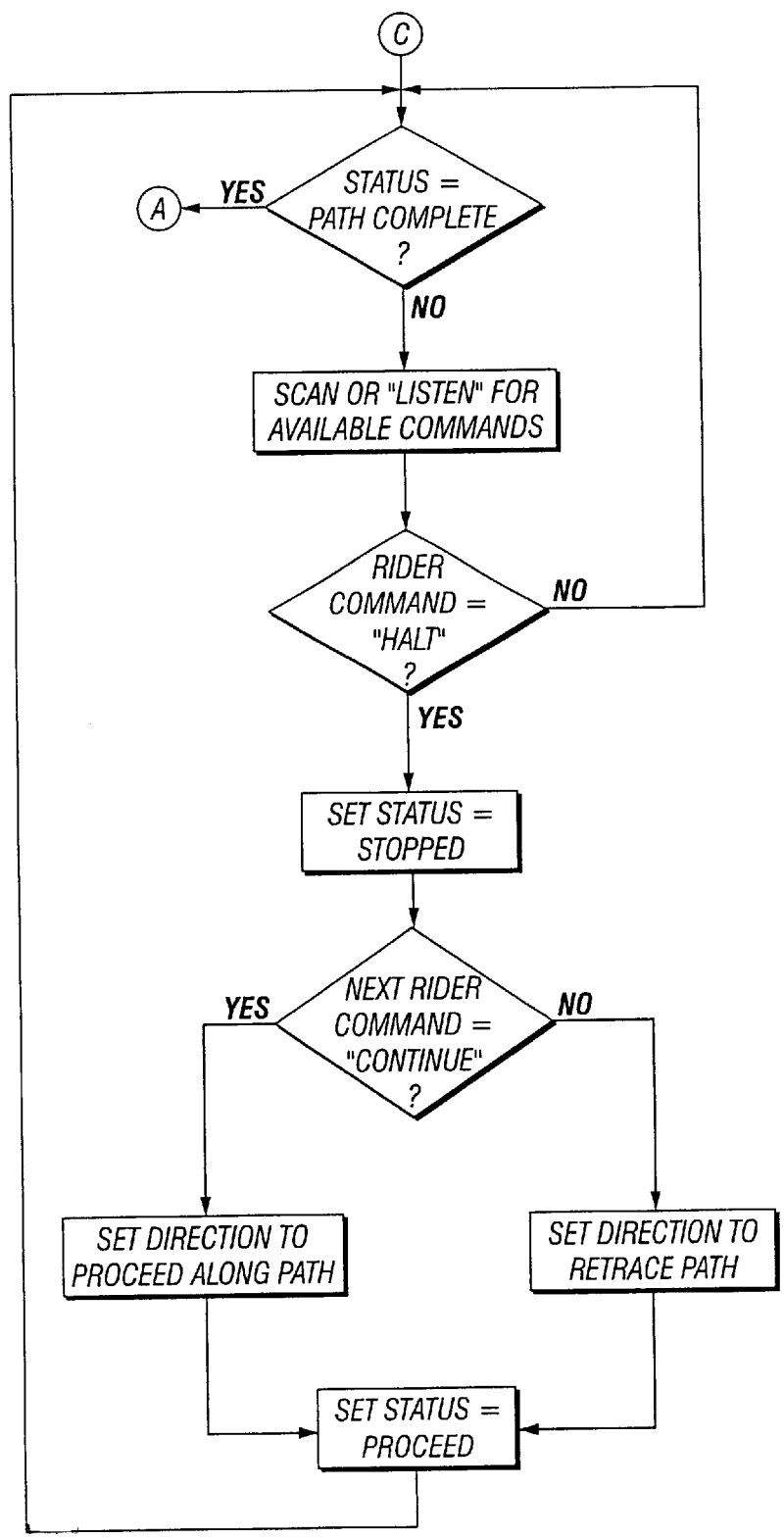

The second embodiment has a single computer 150. The main module has a user-interface (U/I) thread which, after all setup and initialization functions have been performed, the thread monitors the microphone or switch for user commands. Once the rider has selected and confirmed a destination for travel, the U/I thread initiates the navigation thread which, in turn, initiates the sonar thread for obstacle detection. During travel, the U/I thread continues to monitor the microphone or switch in the event the rider wishes to stop the wheelchair 20. When travel is completed, the navigation and sonar threads are suspended until the rider requests further travel. Under these circumstances, resources are consumed only as needed, ensuring maximum responsiveness of the user interface to the rider's actions. The threads communicate with each other by setting and reading a status variable. FIG. 6 represents a schematic chart of these parallel processes.

The navigation system 10 can navigate through an area using a single camera 160. However, by using a single camera 160, the system's position estimates are increasingly uncertain, which causes the wheelchair 20 to reduce speed. This could occur at precisely the moment more power is needed to cross from one location into another (i.e. from linoleum to carpet). To solve this problem, when the wheelchair 20 fails to produce nonzero wheel rotations for a specified number (i.e. 200) of consecutive processing cycles, a brief burst of power is delivered to the wheelchair controller 190, enabling the wheelchair 20 to overcome its inertia. This refinement allows the navigation system to reliably transition from one location to another location which may have a different type of surface (e.g. tile vs. carpet).

Errors in the system's position estimates are calculated from video images in units of pixels. If an error is within a given tolerance, the location of the identified cue 170 is incorporated into the algorithm's estimate of the chair's position. If not, the cue 170 is rejected and the position estimate incorporates only odometry information (dead reckoning). Since the cameras 160 are close to the cues 170 in certain situations such as a narrow hallway, errors in this region are magnified to such an extent that the wheelchair 20 is forced to dead reckon even when cues 170 are properly identified. The generalized solution to this situation is to associate dynamic error tolerances to individual path segments within the files that define each route of travel.

Initialization cues 170 are strategically placed within a specific location wherein all travel within that location commences from that starting point. A variety of paths are pre-programmed in this location.

The current navigation system is a vision-based system in which video detection of wall-mounted cues 170 is combined with odometery information to obtain accurate ongoing estimates of the wheelchair's position and orientation.

The navigation software sends to the power wheelchair controller 190 a signal simulating that of a joystick and guides the wheelchair 20 accurately along paths which the system has previously been pre-programmed or taught by an able bodied human instructor. The 'teach-repeat' paradigm of control, in which human teacher manually pushes the wheelchair 20 along any desired route of travel, obviates the need to fully characterize the geometry of the environment. Such characterizations, normally required for automatic trajectory planners, are difficult to acquire and maintain. The navigation system's 10 only use of ultrasound is to detect near obstacles with which it might otherwise collide.

The navigation system provides fully autonomous navigation. That is, the principal responsibility for steering is delegated to the navigation system 10 with the rider retaining the ability to, at their own discretion, halt and resume travel, or halt and retrace the current path toward the point of departure.

Because the paths are pre-programmed or taught by a human instructor, they readily incorporate close approach to furniture, passage between objects with minimal clearance, and complex motions such as the multiple changes of direction required to maneuver into tight spaces. The human judgment inherent in the original teaching episode is brought to bear in each repetition of the taught path.

The present system extends existing theoretical development for making use of a sequence of incoming, imperfect information combined with a nominal, also imperfect, differential equation model of the 'plant' or system, to produce ongoing best estimates of the 'state' of the system. For nonlinear system dynamics such as those of a motorized wheelchair, a numerical-integration-based filter is used, and described in detail in the article "An Autonomous Vision-Based Mobile Robot," by E. T. Baumgartner and S. B. Skaar. Because only nominal kinematic rather than kinetic equations are used, the navigation system 10 dispenses with time, the usual independent variable, and uses instead a kinematic independent variable: the average forward rotation of the two actuated drive wheels 100 of the wheelchair 20. Since time is no longer the independent variable for control, new means of advancing forward along the reference path must be devised. As with human control of vehicles, it has proven possible and natural to advance the 'target' juncture on the reference path via estimated location rather than time. That is, the point along the path toward which to steer is chosen based on the geometric relationship between the current estimate of actual position and the previously 'learned' reference path.

Several advantages attend the use of forward average wheel rotation as the independent variable. First, since the differential equations are now time-independent, it becomes convenient to control the speed of the vehicle entirely independently of the estimation and tracking algorithms. Hence, vehicle speed may be altered in response to any set of conditions without affecting the position-estimation or tracking algorithm.

Secondly, the vehicle will not 'cut corners' which could jeopardize rider safety in order to "catch-up" with the time-based reference.

Finally, the rider may choose to assert manual control of the wheelchair 20 at any time, taking it from the actual reference path. Since the system's estimator within the computer 150 is activated whether or not it is in control of the chair's motion, and since the control loop is time independent, the navigation system 10 is capable of re-engaging the target path without resorting to any special estimation or control algorithm even though an unplanned detour takes the wheelchair 20 some distance away.

Wheel rotation measurements are taken by the digital shaft encoder 180 and supplemented by observation of visual cues 170 placed in convenient locations throughout the environment of interest. Use of these cues 170 offers a major advantage over the more commonly used ultrasound or sonar in that the 'signature' of the image is distinct, and the frequency of corroborating input is high; hence, there is negligible danger that the system's estimator will become 'confused.' Also, any number of navigation vehicles 20 may navigate the same environment, referencing the same cues 170, without interfering with each other.

The rider may control the navigation system by a single, discrete input such as a spoken word, activation of any simple switch, or touchscreen input. The system provides feedback to the rider via synthesized speech, visual cues, or aural cue. To facilitate path selection, destinations known to the navigation system are stored in a data structure such that only the destinations reachable from a given location are available when the rider is at that location. Once the rider selects an available destination and confirms their intention to travel, motion along the chosen path commences. During travel, the rider may use their input device to assert such supervisory functions as influencing travel speed, halting motion at any point, resuming the original reference path, changing destinations, retracing the path to return to the point of departure, or reasserting manual control of the wheelchair, to the extent the rider is able.

Although particular embodiments of the invention have been described in detail herein with reference to the accompanying drawings, it is to be understood that the invention is not limited to these precise embodiments, and that various changes and modifications may be effected therein by one skilled in the art without departing from the scope or spirit of the invention as defined in the appended claims.

What is claimed is:

1. A wheelchair navigation system comprising:
   a motorized wheelchair;
   at least one computer having software that performs
      navigational functions,
      teaching functions,
      obstacle detection,
      supervisory tasks, and
      diagnostic analysis;
   at least one camera;
   at least one proximity sensor;
   at least one rotation sensor;
   at least one visual sensor;
   at least one visual marker; and
   an input device including one a switch and a microphone, said input device being operatively connected to a control system, said control system controlling operation of said wheelchair by selection of a taught destination from a plurality of taught destinations corresponding to a specific position and orientation of said wheelchair at a predetermined given location of said wheelchair,
   wherein said at least one rotation sensor, said at least one visual sensor and said input device are interfaced to said at least one computer which runs specialized software.

2. A wheelchair navigation system according to claim 1, wherein:
   said at least one computer has a screen with a visual display.

3. A wheelchair navigation system according to claim 1, wherein:
   said computer receives information from said cameras and said sensors, processes said information and determines a path of travel for said wheelchair from such information.

4. A wheelchair navigation system according to claim 1, wherein:
   said computer is voice activated.

5. A wheelchair navigation system according to claim 1, wherein:
   said computer is manually operated.

6. A wheelchair navigation system comprising:
   a motorized wheelchair;
   at least one battery;
   a battery charger;
   a filter-based estimator with interface software;
   a computer including a control system, said control system controlling operation of said wheelchair by selection of a taught destination from a plurality of taught destinations corresponding to a specific position and orientation of said wheelchair at a predetermined given location of said wheelchair;
   at least one camera;
   at least one proximity sensor;
   at least one microphone;
   at least one rotation sensor for the wheels, said at least one sensor is mounted on the wheelchair; and a plurality of visual markers capable of being placed on the walls of a specific location.

7. A wheelchair navigation system according to claim 6, wherein:

said at least one computer has a screen with a visual display that is visible to a person using the wheelchair.

8. A wheelchair navigation system according to claim 6, wherein:

said computer receives information from said cameras and said sensors, processes said information and determines a path of travel for said wheelchair from such information.

9. A wheelchair navigation system according to claim 6, wherein:

said computer is voice activated.

10. A wheelchair navigation system according to claim 6, wherein:

said computer is manually operated.

11. A method of navigation using a powered wheelchair comprising the steps of:

providing a motorized wheelchair, said wheelchair being powered by at least one onboard battery, and a battery charger and having dual cameras, proximity sensors, a microphone and rotation sensors for sensing wheel rotation;

providing a filter-based estimator with interface software running that is operated on at least one computer including a control system, said control system controlling operation of said wheelchair by selection of a taught destination from a plurality of taught destinations corresponding to a specific position and orientation of said wheelchair at a predetermined given location of said wheelchair;

providing markers at various locations within a specific area;

teaching at least one path by walking said wheelchair through said at least one path prior to said wheelchair navigation system being used for independent travel, and recording said at least one path in said computer;

sensing said markers with said proximity sensors and said cameras;

providing information about said markers from said proximity sensors and said cameras to said at least one computer;

operating said software to determine the location of various objects within a location;

creating a path for said wheelchair to avoid said objects with said software;

recalling said at least one taught path; and directing said wheelchair on said path via said software.

12. A method of navigation using a powered wheelchair according to claim 11, further comprising the step of:

operating said computer via voice control.

13. A method of navigation using a powered wheelchair according to claim 11, further comprising the step of:

operating said computer manually.

* * * * *